Feb. 22, 1944.   P. FREDERICKSON   2,342,134
WEEDING MACHINE
Filed Dec. 9, 1942   3 Sheets-Sheet 1
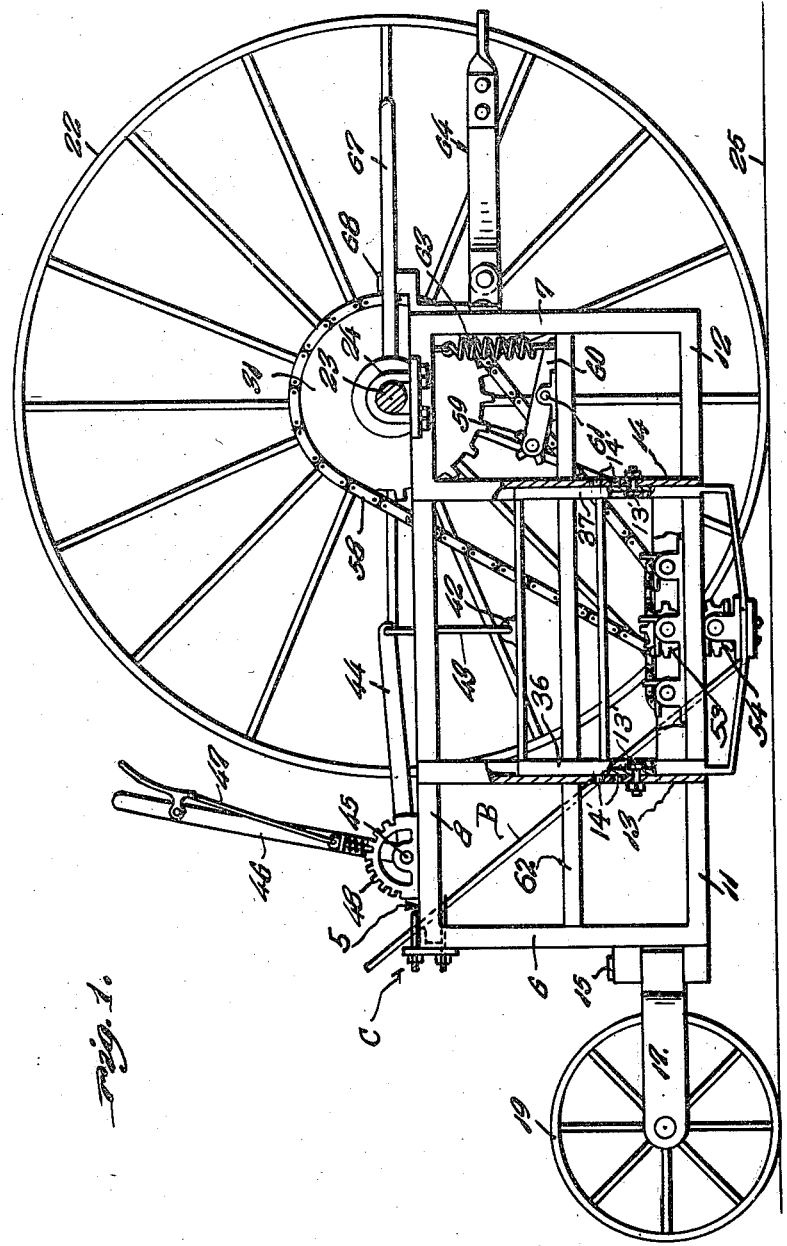
Inventor
Peter Frederickson
By Clarence A. O'Brien
and Harvey B. Jacobson
Attorneys Feb. 22, 1944.　　　P. FREDERICKSON　　　2,342,134
WEEDING MACHINE
Filed Dec. 9, 1942　　　3 Sheets-Sheet 2
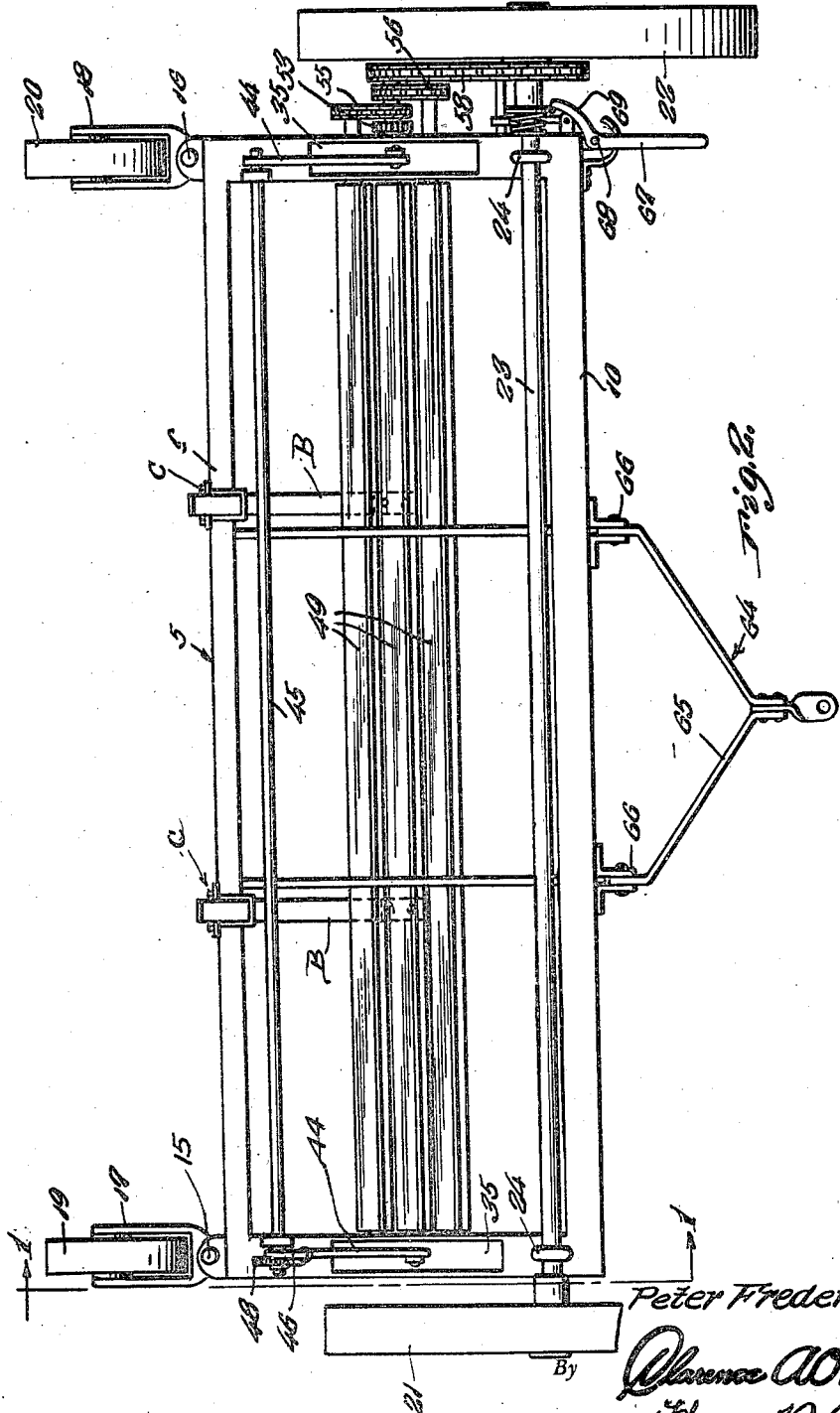
Inventor.
Peter Frederickson

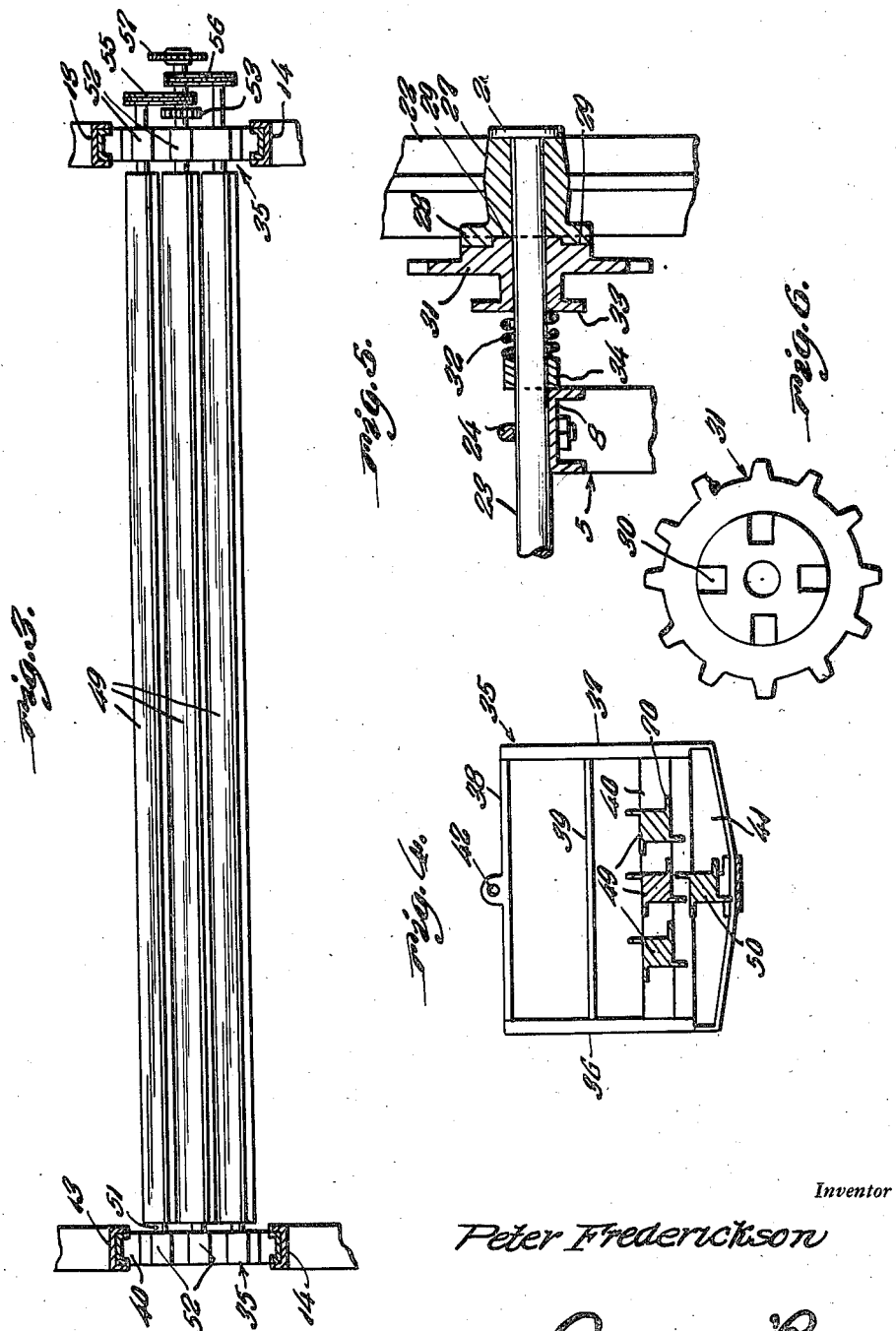

Patented Feb. 22, 1944

2,342,134

UNITED STATES PATENT OFFICE 2,342,134

WEEDING MACHINE

Peter Frederickson, Dannebrog, Nebr.

Application December 9, 1942, Serial No. 468,393

5 Claims. (Cl. 55—66)

My invention relates to improvements in machines for pulling weeds and stubble as the machine is moved over the ground, and the primary object of my invention is to provide a more efficient and adaptable arrangement of this character in which the weed pulling elements are positively vertically adjustable with respect to the ground to positively determine the height of the weeds and stubble to be pulled.

Other important objects and advantages of my invention will be apparent from a reading of the following description taken in connection with the appended drawings, wherein for purposes of illustration I have shown a preferred embodiment of my invention.

In the drawings—

Figure 1 is a general longitudinal vertical sectional and side elevational view of the machine taken along the line 1—1 of Figure 2.

Figure 2 is a top plan view of Figure 1.

Figure 3 is a horizontal sectional view taken through Figure 1 below the rotary puller assembly.

Figure 4 is a longitudinal vertical sectional view taken through the said assembly.

Figure 5 is an enlarged fragmentary vertical longitudinal sectional view taken through one of the ground engaging wheels and its friction connection with the axle.

Figure 6 is an outboard face view of one of the elements of the wheel clutch.

The present application presents improvements particularly over the subject matter of my U. S. Letters Patent No. 2,304,811, dated December 15, 1942, for Weed puller, and provides a more convenient and efficient arrangement of the component parts, and provision for positive vertical adjustment of the weed puller assembly.

Referring in detail to the drawings, the numeral 5 generally designates the transversely elongated generally rectangular box type of frame consisting essentially of vertical end members 6 and 7 at the corners of the frame, upper longitudinal members 8 connecting the upper ends of the vertical members 6 and 7, and transverse members 9 and 10 spacing and connecting the upper ends of the vertical members 6, 6 and 7, 7. Abbreviated lower longitudinal members 11 and 12 are connected to the lower ends of the vertical members 6 and 7 and have their inner ends connected to the lower ends of the vertical guideways 13 and 14 which operatively support the vertically adjustable weed puller assembly.

Hinges 15 and 16 projecting rearwardly from the rear vertical members 6 near the lower edge thereof pivotally connect horizontal wheel forks 17 and 18 in which are mounted ground engaging wheels 19 and 20, respectively.

Large non-dirigible ground engaging wheels 21 and 22 are revolubly mounted on the outer ends of a stationary axle 23 which rests on the upper longitudinal members 8 adjacent the front of the frame 5 as particularly well illustrated in Figure 1 of the drawings, the axle being secured by yokes 24. The wheels described support the frame 5 in a horizontal position with its lower part relatively closely spaced with respect to the ground 25.

Heads 26 on the outer ends of the axle 23 hold the hub 27 of one of the wheels 22 on the axle 23, the said hub having a disk portion 28 at its inboard end which is formed with circumferentially spaced lugs 29 adapted to project into similarly placed recesses 30 in the facing portion of the gear wheel 31 which is also revolubly mounted on the axle 23 and is yieldably forced toward the wheel 22 by a helical spring 32 circumposed on the axle between the terminal element 33 on the gear wheel and a washer or collar 34 which abuts the frame 5, all as shown in Figure 5 of the drawings. The arrangement provides for a crude but effective differential action especially valuable in making turns with the machine and also in preventing the stripping of the gears and connected mechanism should the rotary weed pullers or any operating connections therebetween become clogged and jammed, since under strong forces in opposite directions the gear wheel 31 and the wheel 22 will become operatively disconnected through the yielding of the spring 32. The wheel 21 has simple revoluble mounting on the opposite end of the axle.

Vertically slidable between the pairs of vertical channel guides 13, 13 and 14, 14 is the weed puller assembly frame which is generally designated 35, there being two of the frames 35 as seen in top plan in Figure 2 of the drawings, each characterized by vertical members 36, 37 connecting upper and intermediate members 38 and 39, respectively, and below them is situated the upper roller support 40 and below this the lower roller support 41. The upper bar 38 has an apertured lug 42 in the middle thereof to which is pivotally connected the corresponding one of the links 43 whose upper ends are pivoted to the rear extremities of the levers 44 which are pivotally mounted as indicated by the numeral 45 and connected to the manual adjusting lever 46 which has a manually retractible spring pressed dog 47 engaged with a notched sector 48 mounted on the left hand upper longitudinal member 8. It is obvious that pushing rearwardly on the lever 46 will produce elevation of the weed puller assembly frames 35 and that forward swinging of the lever 46 will depress these frames, and that the desired elevation of the frames may be fixed by engaging the dog 47 with a selected one of the notches in the notched sector 48.

Bolts 13' may be suitably extended through the vertical members 36, 37 and through selected bolt holes 14' in the guides 13, 14 to optionally fix the elevation of the frames 35 if desired.

The pivot 45 is in the nature of a rod which passes across the top of the frame 45 and has the member 44 on the opposite side of the machine secured thereto to raise the weed pulley assembly frame on that side of the machine the same amount as on the other side.

The rotary weed puller assembly comprises the two frames 35, the three upper weed puller rollers which are rotatably mounted in horizontal alignment in the support 40, and the lower weed puller roller 50 which is mounted below the middle one of the rollers 49, in the lower support member 41. The various rollers have stub axles 51 which are journaled in suitable bearings 52 on the support means described. On one side of the machine the stub axles project through the bearings 52 as indicated in the right hand portion of Figure 3 of the drawings.

The lower roller 50 and the middle one of the upper rollers 49 are operatively connected by gears 53 and 54. The stub shafts of the lower gear 54 and the stub shaft of the right hand roller as seen in Figure 4 are operatively connected by a sprocket and chain arrangement generally indicated by the numeral 55 in Figure 3, while the stub shaft of the said middle upper roller is operatively connected to the stub shaft of the left hand upper roller by a sprocket and chain arrangement indicated by the numeral 56. The upper middle roller stub shaft has a relatively large sprocket 57 thereon which is connected by a sprocket chain 58 with the toothed wheel 31 on the axle 23. The various drives described are so proportioned and arranged as to drive the various weed pulling rollers at coordinated rates of speed and in coordinated phases of rotation relative to each other. An idler pinion 59 is carried by a rocker 60 pivotally supported as indicated by the numeral 61 and the intermediate horizontal longitudinal member 62 of the frame 5 is pressed against the inner side of the lower flight of the sprocket chain 58 by the contractile action of a spring 63 which is stretched between the free end of the rocker 60 and an upper part of the frame 5 as clearly indicated in Figure 1 of the drawings, so that the sprocket chain 58 is constantly maintained at the desired tension.

The draft arrangement which is generally designated 64 may comprise a V-shaped draw bar 65 which has its spread rear ends connected at transversely spaced points 66, 66 on the upper part of the front of the frame 5, as indicated in Figure 2 of the drawings, for connection of the described machine to a tractor for pulling the same over the ground. For convenience when moving the machine over the ground in transferring the same from place to place without weed pulling action, a clutch lever 67 pivoted on a vertical axis at 68 to the adjacent corner of the upper part of the frame 5 has a hooked portion 69 engaged behind the annular portion 33 of the drive gear 31 so that by swinging the handle portion of the lever 67 toward the right the gear 31 may be retracted from clutch engagement with the hub of the wheel 22, so that the wheel runs free on the axle without operating the weed pullers.

The weed puller rollers 49 and 50 are of substantially the same construction as those shown and described in my said co-pending application, the same being substantially square in cross section, with longitudinal ribs 70 projecting from the various corners thereof parallel with the adjacent sides, the rollers being arranged so that the ribs interact in different phases of rotation, as indicated in Figure 4 of the drawings, so as to first admit and then grip the weeds which are fed to the upper rollers 49 by the lower roller 50 as the machine moves over the ground and the rollers rotate.

For purposes of assured stability, I prefer to employ suitable reinforcing braces B, these inclining diagonally upward and being fastened in place by clevis-like clamps C as shown in Figures 1 and 2.

Although I have shown and described herein a preferred embodiment of my invention, it is to be definitely understood that I do not wish to limit the application of the invention thereto, except as may be required by the scope of the subjoined claims.

Having described the invention, what is claimed as new is:

1. An ambulatory weed puller comprising a main frame, an axle connected to extend transversely of said main frame, ground engaging wheels mounted on the opposite ends of the axle alongside the main frame, vertical guideways on opposite sides of said main frame, a weed puller assembly comprising end frames slidably adjustably mounted in said guideways, lever operated means for raising and lowering said weed puller assembly including said end frames in said guideways, cooperatively related weed feeding and pulling rollers, said rollers extending transversely with respect to said main frame and having their ends journaled in the corresponding end frames, operating means including operative connections between the various rollers to rotate the same at coordinated rates of speed and in coordinated phases of rotation, said operating means comprising a first sprocket wheel having a sprocket chain trained thereon, and a second sprocket wheel rotatably mounted on said axle and over which said sprocket chain is trained, and drive connection between said second sprocket wheel and the adjacent ground engaging wheel.

2. An ambulatory weed puller according to claim 1 wherein tensioned chain tightener means is provided on said main frame for removing unwanted slack from said sprocket chain during all positions of vertical adjustment of said weed puller assembly.

3. An ambulatory weed puller according to claim 1 wherein tensioned chain tightener means is provided on said main frame for removing unwanted slack from said sprocket chain during all positions of vertical adjustment of said weed puller assembly, said drive connection comprising a first clutch element fixed to said wheel, a second clutch element rotatable on the axle, spring means normally urging said second clutch member into operative engagement with said first clutch element.

4. An ambulatory weed puller according to claim 1 wherein tensioned chain tightener means is provided on said main frame for removing unwanted slack from said sprocket chain during all positions of vertical adjustment of said weed puller assembly, said drive connection comprising a first clutch element fixed to said wheel, a second clutch element rotatable on the axle, spring means normally urging said second clutch member into operative engagement with said first clutch element, and manual means for retracting said second clutch element out of operative engagement with said first clutch element.

5. An ambulatory weed puller according to claim 1 wherein tensioned chain tightener means is provided on said main frame for removing unwanted slack from said sprocket chain during all positions of vertical adjustment of said weed puller assembly, said drive connection comprising a first clutch element fixed to said wheel, a second clutch element rotatable on the axle, spring means normally urging said second clutch member into operative engagement with said first clutch element, and manual means for retracting said second clutch element out of operative engagement with said first clutch element, said second clutch element comprising said second sprocket wheel.

PETER FREDERICKSON.